United States Patent [19]
Kitamura et al.

[11] Patent Number: 4,883,090
[45] Date of Patent: Nov. 28, 1989

[54] MIXING BIBCOCK

[75] Inventors: Yoshiaki Kitamura; Kinji Goto, both of Yamagata, Japan

[73] Assignee: Kitamuragokin Ind. Co., Ltd., Gifu, Japan

[21] Appl. No.: 117,834

[22] Filed: Nov. 9, 1987

[51] Int. Cl.⁴ .......................................... F16K 11/074
[52] U.S. Cl. ................................................ 137/625.41
[58] Field of Search ............ 137/625.41, 625.4, 625.17

[56] References Cited
U.S. PATENT DOCUMENTS 3,625,255 12/1971 Genin ......................... 137/625.41 X
4,423,752 11/1984 Psarouthakis ................... 137/625.41
4,540,023 9/1985 Pawelzik ........................ 137/625.17

FOREIGN PATENT DOCUMENTS

2803663 8/1979 Fed. Rep. of Germany ....................... 137/625.41
337198 2/1936 Italy ................................. 137/625.41
56-37179 9/1981 Japan .

Primary Examiner—Alan Cohan
Attorney, Agent, or Firm—Wenderoth, Lind & Ponack

[57] ABSTRACT

The invention relates the mixing valve for controlling the mixture of hot and cold water. The valve takes the form of a fixed and movable plate. A recessed guide groove in the movable plate is formed as a blind groove cooperating with hot and cold water ports and an outlet in the fixed plate. The guide groove has several branches arranged to variably connect to the hot and cold water ports in different relative positions of the movable and fixed plates.

3 Claims, 7 Drawing Sheets

MIXING BIBCOCK

BRIEF DESCRIPTION OF THE INVENTION

This invention relates to a ceramic plate valve of a cold water and a hot water mixing bibcock of sanitary use, and an improvement in its operating method.

BACKGROUND OF THE INVENTION

Figure 7:
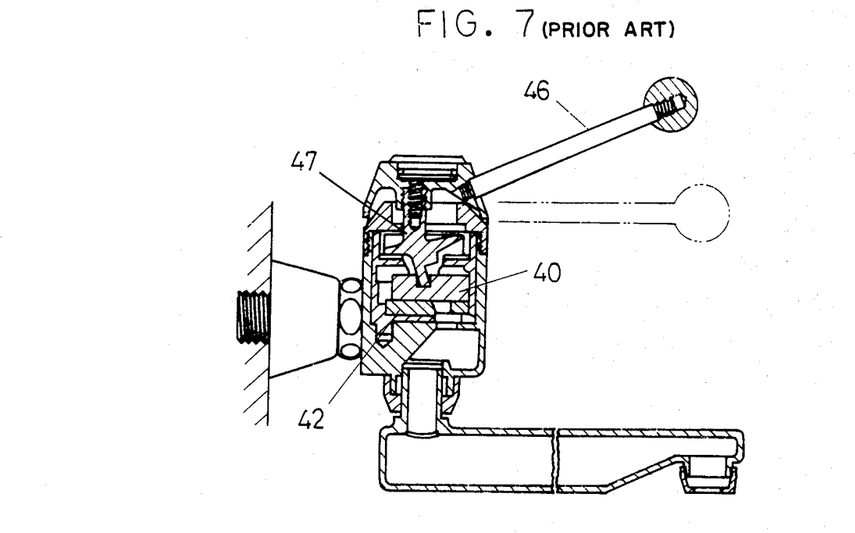
FIGS. 7 and 8 are views illustrating a conventional bibcock in which the procedure of operating the lever vertically and horizontally is illustrated.
Figure 8:
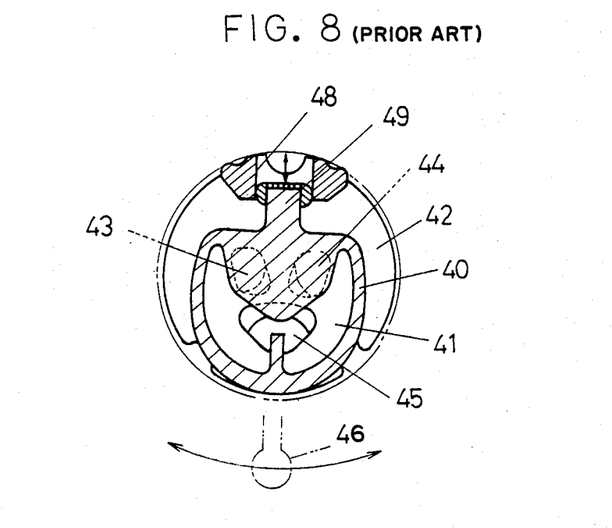

A conventional valve mechanism having a pair of ceramic plate valves which are installed in a valve chamber of a mixing bibcock is shown in FIGS. 1 and 6 of Japanese Patent Publication No. 37179/1981, and in FIGS. 7 and 8 of the present application.

The valve mechanism shown in FIGS. 7 and 8 will now be briefly described.

A movable plate valve 40 has a mixing chamber 41 shaped as a downward-facing blind hole. The movable plate valve 40 is placed on top of a fixed plate valve 42. A hot water inlet port 43 and a cold water inlet port 44 in plate valve 42 are adapted to be freely opened and closed, and are adapted to be connected to an outlet 45 through the mixing chamber 41. The plate valve 40 is positioned in its forwardmost position and hot water inlet port 43 and the cold water inlet port 44 are closed when a lever 46 is positioned as shown by the solid lines. Hot water and cold water are discharged in equal quantities when the plate valve 40 is moved rearwardly when the lever 46 is pushed down to the horizontal position shown by the alternate long and two short dashed lines. More hot water is discharged when the lever 46 is turned horizontally to the right. The water is stopped when the lever 46 is restored to the central position and is tilted up. The movable plate valve 40, which is connected to the lever 46 by the valve shaft 47, moves backward and forward along a guide portion 49 connected to a guide groove 48 that is provided in the fixed plate valve 42 for the purpose of discharging or stopping the hot and cold water.

However, this structure has a problem in that the valve mechanism is not easy for children or people with handicapped hands to operate, and errors in operation tend to occur because the discharge and stopping of the hot and cold water is carried out by moving the lever vertically, and the discharge of hot and cold water, either separately or together, is carried out by moving the lever horizontally.

Furthermore, when the hot water inlet port is fully open, the water flow rate rapidly decreases. As a result, the temperature of the hot water must be adjusted whenever the hot water inlet port is fully open.

The mechanism of the connection between the fixed plate valve and the valve shaft is excessively complicated, because the movable plate valve is adapted to both turn and reciprocate. As a result, the number of parts is increased, and assembly and disassembly when a problem occurs is complicated, which adversely affects maintenance and productivity.

OBJECT AND BRIEF SUMMARY OF THE INVENTION

It is an object of the present invention to provide a mechanism in which the individual supply of hot and cold water, and the mixture, temperature adjustment, supply and stoppage of water, can be conducted simply by turning the lever horizontally so as to move the movable plate valve which opens and closes the valve mechanism. To this end, the mechanism of the connection between the lever and the movable plate valve is simplified according to the present invention, to ensure easy operation, prevent operating errors, and simplifying maintenance.

The valve mechanism of the present invention comprises a fixed plate valve and a movable plate valve in the form of similar discs and which are made of ceramic. The movable plate valve has a recessed guide groove which is formed as a blind groove in the surface abutting the fixed plate valve (bottom surface in this embodiment). The recessed guide groove comprises a cold water guide port at one end thereof which is adapted to be connected to a cold water inlet port of the fixed plate valve by the movement of a lever. The recessed guide groove further comprises a hot water guide port at another edge part thereof which is adapted to be connected to the hot inlet port of the fixed plate valve by the movement of the lever. The recessed guide groove is always connected to an outlet of the fixed plate valve. A plurality of recessed pawl holes used for securing pawls which are provided on the fixed plate valve is provided in the edge of the upper surface of the movable plate valve. All of the hot water inlet port, cold water inlet port, and outlet, which are provided in the fixed plate valve, penetrate the fixed plate valve to connect the top surface thereof to the bottom surface. The surfaces of this fixed plate valve and the movable plate valve are fitted against each other to form a plate valve unit.

The interior of a main body of the mixing bibcock supports the fixed plate valve with a seating plate therebetween. A boss is rotatably secured by means of a securing pawl and a pawl hole to the valve chamber of an inner cylinder. The movable plate valve, which is movably secured by the boss, is inserted in the valve chamber of the inner cylinder. The movable plate valve and the fixed plate valve face each other at abutting surfaces thereof. A handle grill having a lever is secured by a screw to a handle shaft which is provided on the boss. As a result of this structure, the supply of appropriate quantities of hot and cold water, or a mixture thereof of any desired temperature, and temperature adjustment can be conducted by only horizontal operation of the lever.

The supply and stoppage of hot and cold water can be selectively conducted by the simple horizontal operation of a lever to meet various needs, such as the supply of appropriate quantities of hot or cold water, or a mixture thereof of a suitable temperature.

BRIEF DESCRIPTION OF THE DRAWINGS

An embodiment of the present invention will now be described with reference to the accompanying drawings, in which.

DETAILED DESCRIPTION OF THE INVENTION

In FIGS. 1–3(B), a fixed plate valve 1 and a movable plate valve 2, which are formed from ceramic in a disc shape, are shown. The fixed plate valve 1 comprises at one edge part of the abutting surface 3 (surface against which the movable plate valve abuts) thereof a cold water inlet port 4 which is adapted to be connected to a cold water guide port 6 which is formed as a blind hole in movable plate valve 2, by the moving of a lever 5, to be described hereinafter. The fixed plate valve 1 further comprises at another edge part of the abutting surface 3 thereof a hot water inlet port 7 which is also adapted to be connected to a hot water guide port 8 of the movable plate valve 2 by the movement of the same lever 5. A recessed water guide groove 10 is provided in movable valve plate 2 which connects the hot water guide port 8 to the cold water guide port 6 by an intermediate portion thereof, and which is always open to an outlet 9 in the fixed plate valve 1. A plurality of pawl holes 13 which are adapted to be secured to a plurality of securing pawls 12 to be described later, is provided in the opposite surface of the movable plate valve 2 from the surface with the recessed guide groove 10 (namely, in the top of the movable plate valve 2). Each of the cold water inlet port 4, hot water inlet port 7, and outlet 9 extends through the fixed plate valve 1, connecting the top surface and bottom surface of the fixed plate valve 1. A plate valve unit A is formed by combining the fixed plate valve 1 and the movable plate valve 2 in such a manner that the abutting surface 3a of the movable plate valve 2 and the abutting surface 3 of the fixed plate valve 1 face and abut each other. A casing 15 is secured to a threaded mounting recess 14 in the upper portion of a main body B of the mixing bibcock. An inner cylinder 18 having a seating plate 16 and a valve chamber 17 is secured to the casing 15. The fixed plate valve 1 and the movable plate valve 2 are inserted in the valve chamber 17 in such a manner that the fixed plate valve 1 is below, and the movable plate valve 2 is positioned above, and the abutting surfaces 3 and 3a thereof face and abut each other. A handle shaft 19 is integrally provided on a boss 20 by insert forming. The boss 20 and the inner cylinder 18, which is inserted into the casing 15, are freely movable with respect to each other in the rotational direction through symmetrically formed step surfaces 21 and 21a. A spring 23 and a ball 24 which are arranged to stop the boss 20 at a cold water stop position, to be described hereinafter, are arranged in a lateral hole 22 that is bored in the boss 20 and a handle shaft 19. A stopper 25 which projects from the circumference of the boss 20 engaged with a lateral guide groove 26 which horizontally faces the inner circumference of the inner cylinder 18, and which is formed in a semicircular arc. The position at which the stopper 25 hits and stops at a left step part 27 is defined as a position for supplying hot water, to be described hereinafter, and the position at which the stopper 25 hits and stops at a right step part 27a is defined as a position for supplying cold water, to be described hereinafter. A plurality of securing pawls 12 projects from the bottom surface of the boss 20. These securing pawls 12 are fitted into the pawl holes 13 which are provided in the top surface of the movable plate valve 2, so as to enable the movable plate valve 2 to be turned by the boss 20. A handle grill 28 is connected to the handle shaft 19 by a screw 29. The lever 5 projects in the circumferential direction from the upper portion of the handle grill 28. Both hot water and cold water are stopped when the lever 5 is positioned in the same vertical plane with a water discharge pipe 30. When the lever 5 is positioned at the hot water supply position shown in FIG. 5(A), after being turned horizontally to the left from the water stop position, the hot water supply pipe 31 shown in FIG. 6 supplies a full flow of hot water. Simultaneously with this full flow of hot water, a part of the recessed guide groove 10 and a small corner portion 4a of the cold water inlet port 4 are connected to each other by guide groove 10. Due to this connection of the guide groove 10 and the cold water inlet port 4, cold water in a cold water supply chamber 32 is gradually heated by conduction of heat when hot water is fully supplied for a long time. As a result, the surfaces of the main body B of the mixing bibcock are protected from overheating. By moving the lever 5 to intermediate positions between the water stop position and the hot water supply position, a mixture of hot and cold water, and temperature adjustment of the water, can be freely conducted. By moving the lever 5 to intermediate positions between the water stop position and the cold water supply position, the cold water flow rate can be freely adjusted. The cold water in the cold water supply chamber 32 is supplied to the water delivery pipe 30 through the cold water inlet port 4, recessed guide groove 10, and outlet 9, and a delivery chamber 11 shown in FIG. 1. Hot water in the hot water supply chamber 33 is supplied to the water delivery pipe 30 through the hot water inlet port 7, recessed guide groove 10, outlet 9, and the delivery chamber 11.

Figure 1:
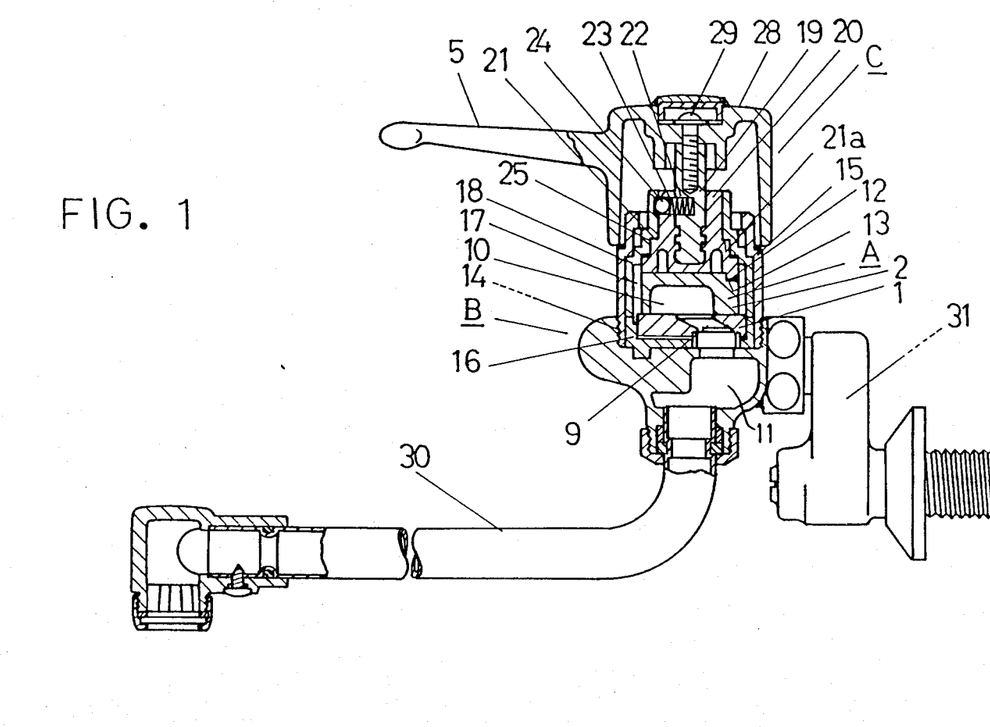
FIG. 1 is a vertical sectional view of a mixing bibcock according to the present invention.
Figure 2A:
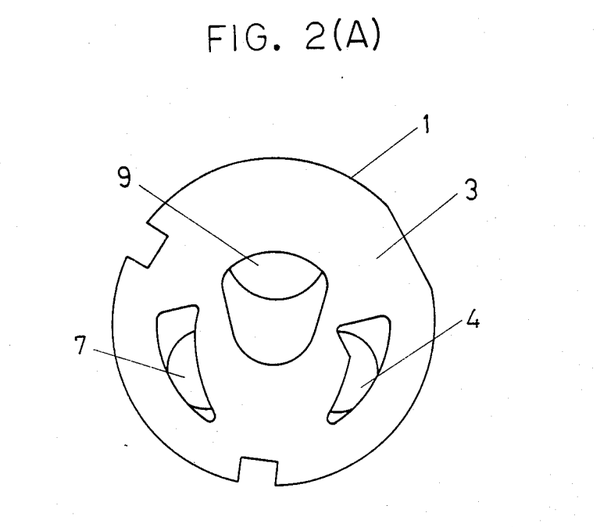
FIG. 2(A) is a plan view of a fixed plate valve thereof.
Figure 2B:
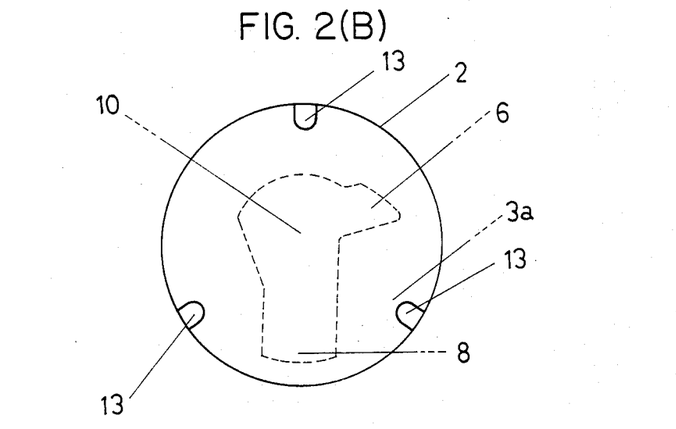
FIG. 2(B) is a plan view of a movable plate valve thereof.
Figure 3A:
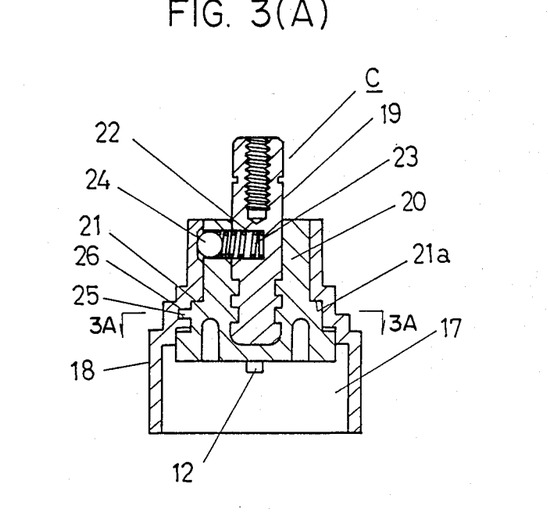
FIG. 3(A) is a vertical cross sectional view of the operating mechanism thereof.
Figure 3B:
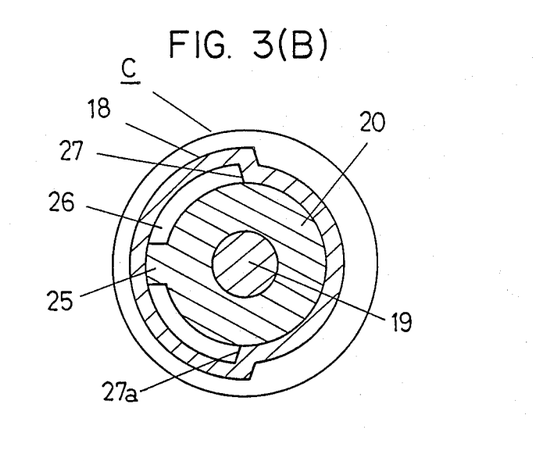
FIG. 3(B) is a cross sectional view taken along the line 3A—3A of FIG. 3(A)
Figure 4A:
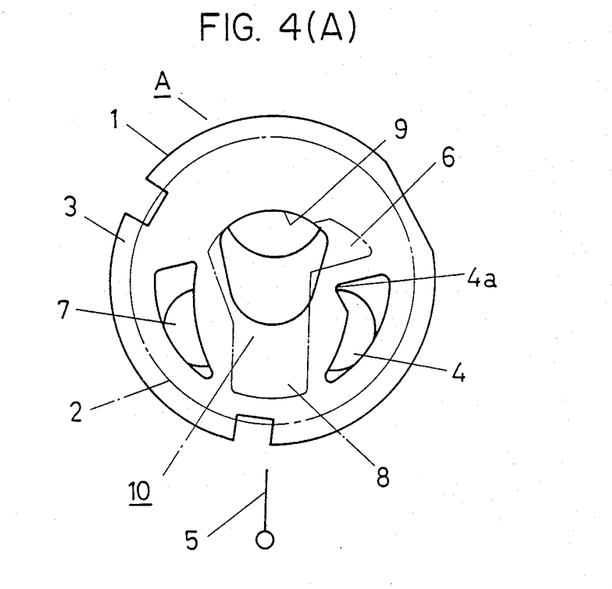
FIG. 4(A) is a view of the plate valves illustrating the relationship between a lever and a position at which water flow is stopped.
Figure 4B:
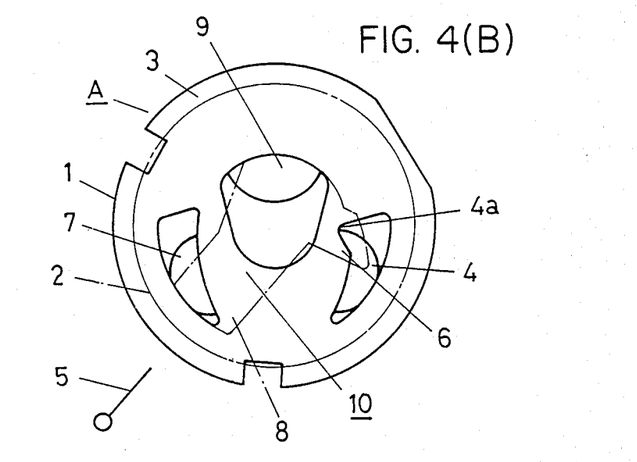
FIG. 4(B) is a view similar to FIG. 4(A) illustrating the relationship between the lever position and the mixing ratio of hot and cold water and temperature adjustment.
Figure 5A:
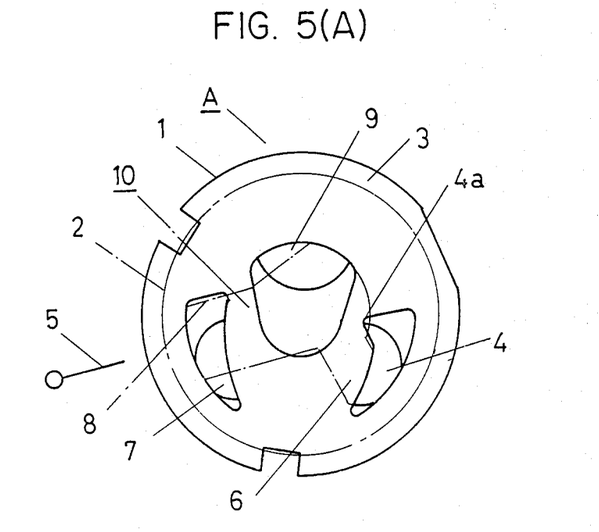
FIG. 5(A) is a view similar to FIG. 4(A) illustrating the relationship between the lever position and the full flow of hot water and small flow of cold water.
Figure 5B:
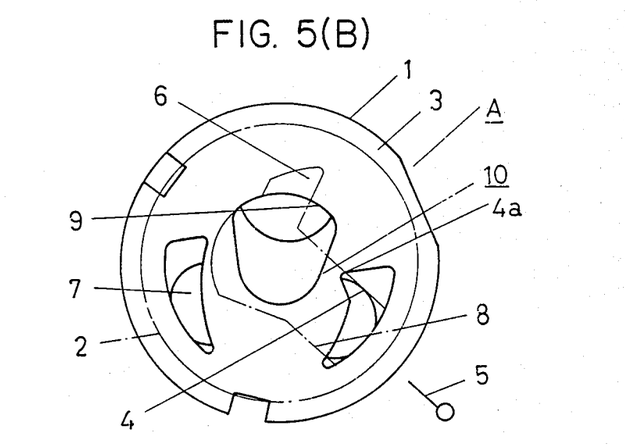
FIG. 5(B) is a view similar to FIG. 4(A) illustrating the relationship between the lever position and full flow of cold water only.
Figure 6:
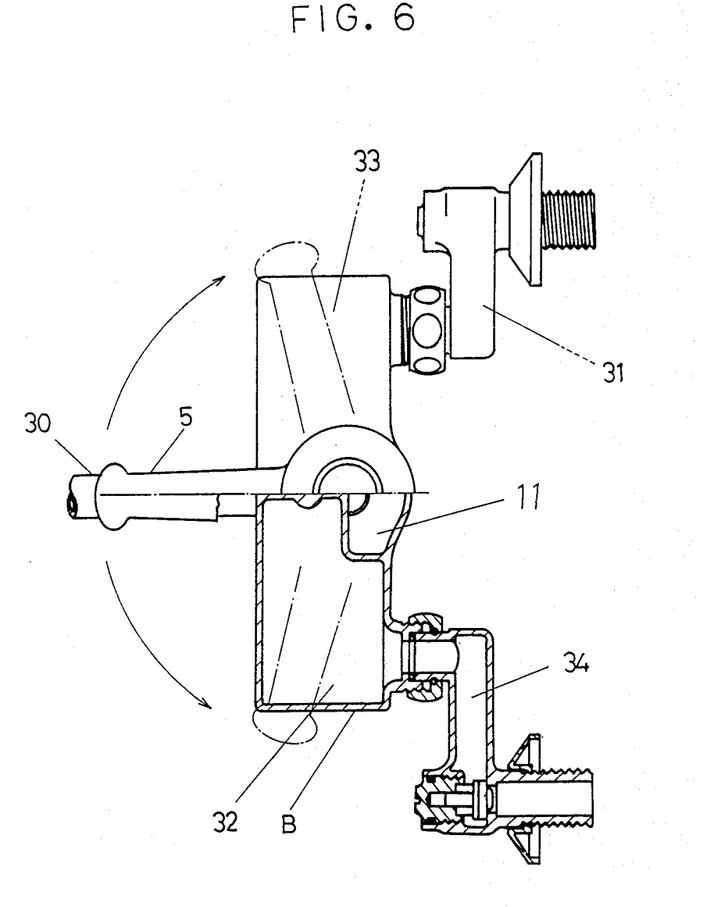
FIG. 6 is a plan view, partly in section, of the mixing bibcock, illustrating the relationship between the bibcock and the levers.

When the lever 5 positioned at the stop position is gradually moved from the position shown in FIG. 4(A) to the left, the boss 20 which is connected to the handle grill 28, which is integrally formed with the lever 5 through the handle shaft 19, is turned in the same direction as that of the lever 5. The movable plate valve 2, which is connected to the boss 20 by the securing pawls 12 and the pawl holes 13, is turned in the same direction as the lever 5 and the boss 20. As a result, the hot water guide port 8 which is provided in the recessed guide groove 10 of the movable plate valve 2 is connected to the hot water inlet port 7 of the fixed plate valve 1, and, at the same time, the cold water guide port 6 of the recessed guide groove 10 is connected to the cold water inlet port 4 of the fixed plate valve 1. Consequently, hot and cold water are supplied in equal quantities. As the lever 5 is moved to the left with these positional relationships kept as they are, the quantity of hot water increases, while the quantity of cold water decreases toward zero. During this process, the stopper 25 of the boss 20 approaches the step part 27 in the lateral guide groove 26. The lever 5 stops at the position at which the stopper 25 hits the step part 27. A full flow of hot water is supplied at this stop position. When hot water is supplied in this way, the relationships between the recessed guide groove 10 and the hot water inlet port 7 and the cold water inlet port 4 are as shown in FIG. 5(A), in which the hot water guide port 8 and the hot water inlet port 7 are fully connected, and the cold water guide port 6 is cut off from the cold water inlet port 4. However, part of the recessed guide groove 10 and the corner portion 4a of the cold water inlet port 4 are slightly connected, so that some of the cold water in the cold water supply chamber 32 is delivered with the hot water. As a result, the cold water in the cold water supply chamber 32 is prevented from expansion by heating, even when hot water is continuously supplied. Since the quantity of cold water supplied increases linearly with the movement of the lever 5 to the right after the hot water supply has been ended by the movement of the lever 5 to the water stop position, a desired quantity of cold water can be supplied. As the lever 5 is gradually moved to the right, the stopper 25 of the boss 20 similarly approaches the step part 27a in the lateral guide groove 26. The lever 5 is stopped at the cold water supply position when the stopper 25 hits the step part 27a, and only cold water is supplied at this position. During the movement of the lever 5 to the right, the relationships between the recessed guide groove 10 and the cold water guide port 6 contribute to an increase in the quantity of cold water. Therefore, a desired quantity of cold water can be supplied.

As described above, the device according to the present invention displays the following advantages:

(1) Because a guide groove formed as a blind hole having a cold water guide port and a hot water guide port at each end thereof is recessed into an abutting surface of a movable plate valve, the flow rate of a mixture of hot and cold water and the temperature of the water can be adjusted, and a full flow of hot water can be supplied by turning a lever horizontally to the left from a stop position, and the full flow rate of cold water can be adjusted, and a full flow of cold water can be supplied by turning the lever horizontally to the right from the stop position.

(2) Because the movable plate valve and a boss are secured to each other by securing pawls and pawl holes, and a handle shaft integrally provided on the boss and a handle grill are integrally connected, operability is improved by enabling a simple turning of the lever horizontally to either side of a stop position, and dangerous splashing of hot water can be completely prevented, even if the lever is rapidly turned to either the right or the left.

(3) Because the boss and an inner cylinder which accommodates the boss are arranged to slide smoothly by means of the symmetrical step surfaces, the structure can be made to strongly correspond to the fluid pressure applied to the movable plate valve, and the mixing bibcock can be operated very smoothly without any restrictions applied to the turning of the boss and the movable plate valve.

(4) In comparison with the conventional vertical or horizontal movement of a lever, the operability is improved because a simple handling of the lever in only the horizontal direction to either the right or the left produces a supply of the desired hot water, cold water, or a mixture thereof, and even with hands that cannot move freely, the mixing bibcock can be operated securely and errors in operation can be prevented, and since the operating mechanism is so simple, the cost can be reduced in the manufacturing and in the product distribution process.

I claim:

1. A mixing bibcock having a valve mechanism for individually supplying hot water, cold water, or a mixture thereof at a desired temperature, said mixing bibcock comprising:

a fixed plate valve having a cold water inlet port, a hot water inlet port, and an outlet port, said ports all extending through said fixed plate valve to connect the top surface thereof to the bottom surface thereof;

a movable plate valve having a recessed water guide groove in the form of a blind hole in one surface thereof;

a main mixing valve body having a valve chamber therein in which said fixed plate valve and said movable plate valve are positioned with the one surface of said movable plate valve abutting one surface of said fixed plate valve and with said recessed water guide groove always in communication with said outlet port in all positions of movement of said movable plate valve on the abutting surface of said fixed plate valve;

an operating means connected to said movable plate valve for reciprocally turning said movable plate valve in a plane on the abutting surface of said fixed plate valve between a middle position which is between said two inlet ports and two end positions on opposite sides of said middle position which are respectively toward said cold water inlet port and said hot water inlet port;

said recessed water guide groove having a first branch extending generally radially outwardly of said movable plate valve and when said movable plate valve is in said middle position, lying between said inlet ports and being movable toward said inlet ports for gradually uncovering the respective inlet ports as said movable plate valve is moved toward the respective end positions, and having a second branch extending radially of said movable plate valve and at an angle to said first branch which, when said movable plate valve is in said middle position, causes said second branch to be inclined toward said cold water inlet, said second branch having a shape which, when said movable plate valve is moved toward the end position corresponding to the hot water inlet, at first comes into communication with said cold water inlet for mixing cold water with the hot water flowing through said recessed water guide groove and gradually increases the area of communication to a maximum and then gradually decreases the area of communication to a minimum as said first branch uncovers the hot water inlet port.

2. A mixing bibcock as claimed in claim 1 in which said minimum area of communication is slightly greater than zero, whereby said recessed water guide groove is always in communication with said cold water inlet port to at least a small degree.

3. A mixing bibcock as claimed in claim 1 in which said operating means comprises a boss over said movable plate valve, pawl means connecting said boss to said movable plate valve for turning said movable plate valve when said boss is turned, and a lever attached to said boss for turning said boss.

* * * * *